US012634218B2

(12) United States Patent
Santos et al.

(10) Patent No.: US 12,634,218 B2
(45) Date of Patent: May 19, 2026

(54) CELLULAR NETWORK COMPONENT AUTOMATED HEALTH CHECKS

(71) Applicant: Boost SubscriberCo L.L.C., Englewood, CO (US)

(72) Inventors: Victor Elizondo Santos, Englewood, CO (US); Gaurang Deshmukh, Denver, CO (US); Dean DellaLoggia, Englewood, CO (US); Nidhi Gandhi, Englewood, CO (US); Jonathan Amdahl, Castle Rock, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 77 days.

(21) Appl. No.: 18/890,571

(22) Filed: Sep. 19, 2024

(65) Prior Publication Data

US 2026/0081860 A1 Mar. 19, 2026

(51) Int. Cl.
H04L 43/10 (2022.01)
H04L 41/12 (2022.01)

(52) U.S. Cl.
CPC .............. H04L 43/10 (2013.01); H04L 41/12 (2013.01)

(58) Field of Classification Search
CPC ................................. H04L 43/10; H04L 41/12
See application file for complete search history.

(56) References Cited

U.S. PATENT DOCUMENTS

| | | | | |
|---|---|---|---|---|
| 7,313,735 B1 * | 12/2007 | Levergood | .......... | G06F 11/2294 |
| | | | | 714/47.3 |
| 9,146,798 B2 * | 9/2015 | Gupta | ................. | G06F 11/0763 |
| 9,336,060 B2 * | 5/2016 | Nori | .................... | H04L 41/0806 |
| 9,397,905 B1 * | 7/2016 | Moniz | ................... | H04L 67/025 |
| 9,992,086 B1 * | 6/2018 | Mizik | ...................... | H04L 43/20 |
| 10,148,544 B2 * | 12/2018 | Prakash | ................. | H04L 43/10 |
| 11,575,559 B1 * | 2/2023 | Khanna | .............. | H04L 41/0645 |
| 11,856,052 B2 * | 12/2023 | Rao Krishnagi | ... | H04L 63/0263 |
| 12,314,119 B2 * | 5/2025 | Nagesh | .............. | G06F 11/3006 |
| 2009/0049152 A1 * | 2/2009 | Rimhagen | .............. | H04L 43/06 |
| | | | | 709/209 |
| 2013/0124713 A1 * | 5/2013 | Feinberg | ............ | G06F 11/3086 |
| | | | | 709/224 |
| 2019/0089618 A1 * | 3/2019 | Kludy | ................. | H04L 43/0817 |
| 2020/0076701 A1 * | 3/2020 | Gershaft | ................ | G06Q 10/06 |
| 2022/0263890 A1 * | 8/2022 | Rao Krishnagi | ......... | G06F 8/65 |

(Continued)

*Primary Examiner* — Oanh Duong

(74) *Attorney, Agent, or Firm* — Jeremiah J. Baunach; Frontier IP Law PLLC

(57) ABSTRACT

Systems and methods for performing automated health checks on cellular network components are disclosed. Cluster data regarding network components is obtained from a cluster management tool and used to aggregate configuration files into a master configuration file. A topology file for on-premises components is created based on the master file. Health status for each component is determined using a dataset developed from the topology file, involving extracting and joining alarm data and container orchestration platform data. A payload with health check results is generated, optionally converted to a standard format, and published to a streaming platform and cloud storage. The system enables comprehensive monitoring of cloud and on-premises components to facilitate proactive network management.

20 Claims, 7 Drawing Sheets

(56)  References Cited

U.S. PATENT DOCUMENTS

| | | | |
|---|---|---|---|
| 2023/0093659 A1* | 3/2023 | O'Dell ...................... | G06F 9/54 |
| | | | 719/328 |
| 2023/0177378 A1* | 6/2023 | Hassan .................. | G06N 20/00 |
| | | | 706/12 |
| 2023/0205681 A1* | 6/2023 | Gupta ................. | G06F 11/3688 |
| | | | 717/125 |
| 2023/0418731 A1* | 12/2023 | Gupta ................. | G06F 11/3684 |
| 2024/0121636 A1* | 4/2024 | Wang ................... | H04W 24/08 |
| 2024/0241741 A1* | 7/2024 | Padevski ............ | G06F 9/45558 |
| 2024/0248791 A1* | 7/2024 | Biswal ............... | G06F 11/0793 |

* cited by examiner

300

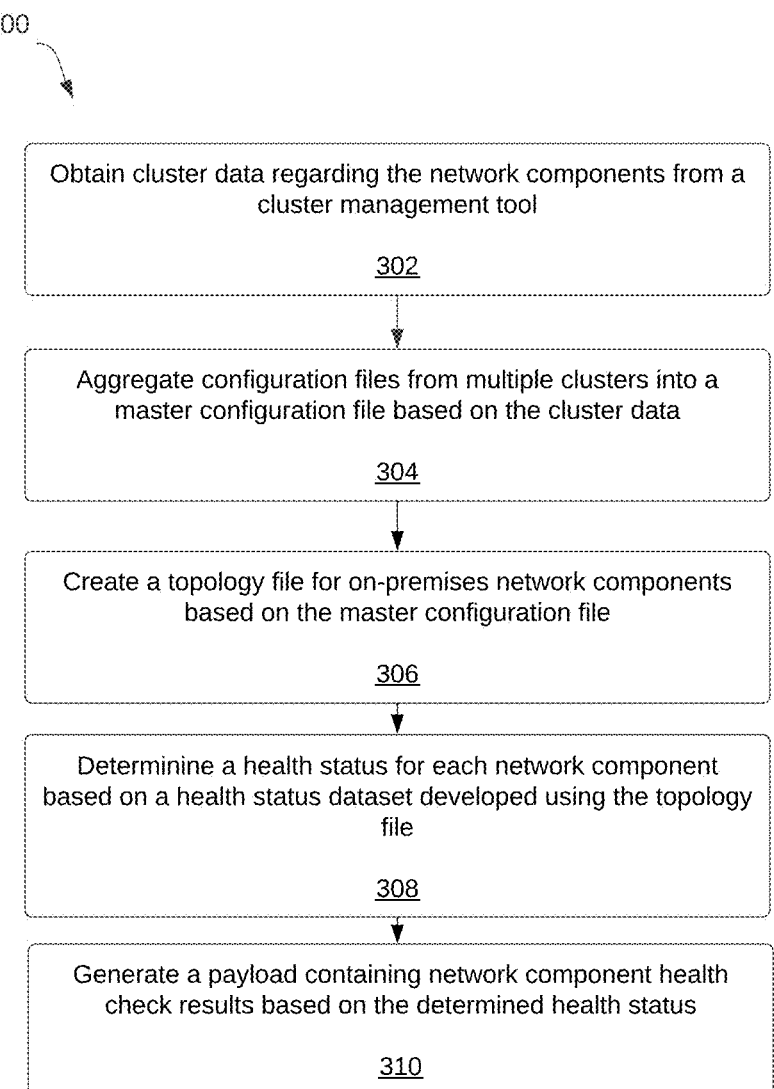

Obtain cluster data regarding the network components from a cluster management tool

302

Aggregate configuration files from multiple clusters into a master configuration file based on the cluster data

304

Create a topology file for on-premises network components based on the master configuration file

306

Determinine a health status for each network component based on a health status dataset developed using the topology file

308

Generate a payload containing network component health check results based on the determined health status

Convert the payload containing network component health
check results to a standardized format

402

Publish the converted payload containing network component
health check results to a distributed streaming platform

404

Store the converted payload containing network component
health check results in a cloud storage service

406

500

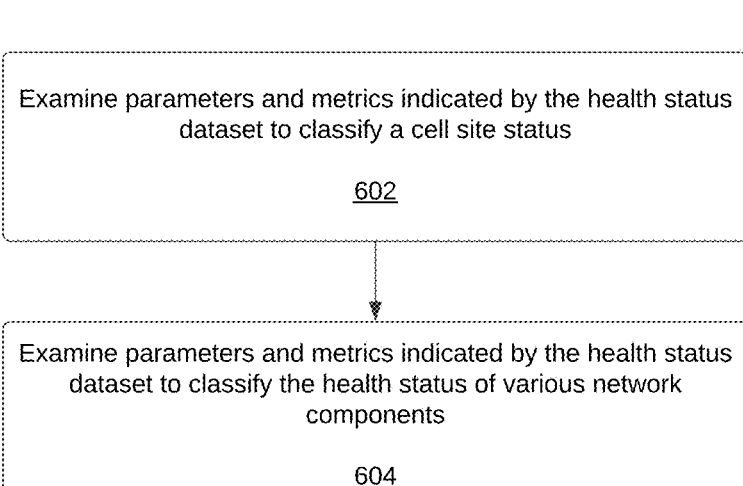
*Fig. 6*

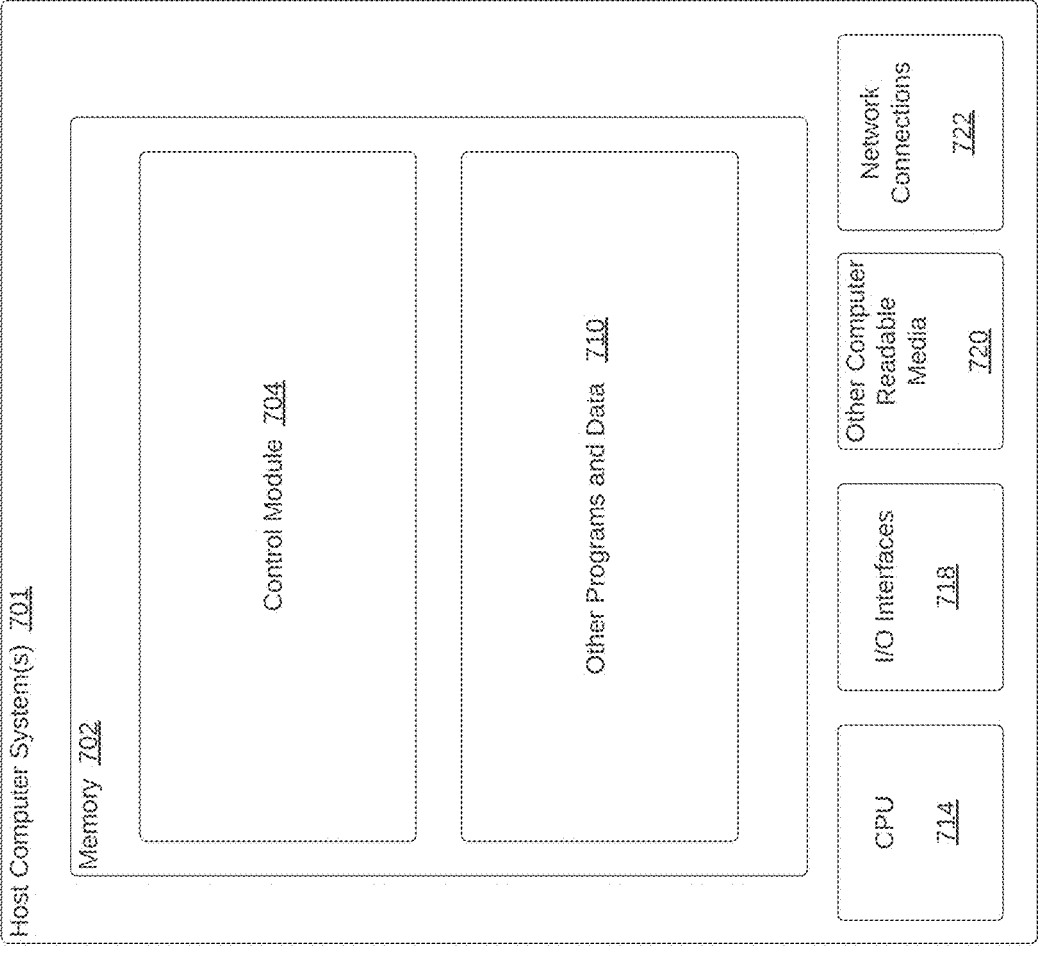
*Fig. 7*

CELLULAR NETWORK COMPONENT AUTOMATED HEALTH CHECKS

TECHNICAL FIELD

The present disclosure relates to network health checks, and particularly automated health checks for cellular network components.

BRIEF SUMMARY

Cellular networks, particularly Fifth Generation (5G) networks, face increasing complexity with the integration of cloud-based and on-premises components. This complexity makes it challenging to efficiently monitor and maintain the health of diverse network elements, potentially leading to reduced network performance, reliability issues, and increased downtime. There currently does not exist a comprehensive view of both cloud-based and on-premises components, leaving network operators with incomplete or fragmented information about their network's health.

To address these challenges, in various example embodiments, systems and methods are disclosed for performing automated health checks on cellular network components. In various embodiments, a health check system obtains cluster data regarding network components from a cluster management tool and aggregates configuration files regarding the cluster data into a master configuration file. A topology file is created for on-premises network components based on the master configuration file.

The system determines a health status for each network component based on a health status dataset developed using the topology file. This involves executing health check scripts to extract alarm data from an element management system and accessing a container orchestration platform to obtain information about containerized network components. The system joins this data to create a health status dataset, which is then flattened. Actual and expected Physical Random Access Channel (PRACH) fields are added, and disabled cells are detected based on the dataset.

The health status determination process includes examining various parameters and metrics indicated by the health status dataset to classify cell site status and the health of different network components. This may involve filtering and classifying alarms, evaluating container statuses, and assessing criteria such as cloud services router reachability, master node status, and virtualization platform synchronization state.

A payload containing network component health check results is generated based on the determined health statuses. This payload may be converted to a standardized format, published to a distributed streaming platform, and stored in cloud storage. The health check results can be made available to network operations personnel via data visualization dashboards.

The system performs health checks on various network components, including centralized units (CUs) and distributed units (DUs) in 5G networks. The system may be implemented within a containerized environment running on a cloud computing platform, providing scalability and flexibility.

Additionally, the system may detect differences between network components implemented in cloud environments versus on-premises devices, and adjust the health check process accordingly.

By enabling efficient and comprehensive monitoring of both cloud-based and on-premises network components, the system provides a holistic view of network health. This allows for proactive management and maintenance, helping to prevent issues before they impact network performance and reliability.

BRIEF DESCRIPTION OF THE DRAWINGS

FIG. 3 is a is a flow diagram of an example method for performing health checks on network components in a cellular wireless network, according to one non-limiting embodiment.

FIG. 6 is a flow diagram of an example method including further actions for determining the health status for each network component useful in the method of FIG. 5, according to one non-limiting embodiment.

FIG. 7 shows a system diagram that describes an example embodiment of a computing system(s) for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or"

operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
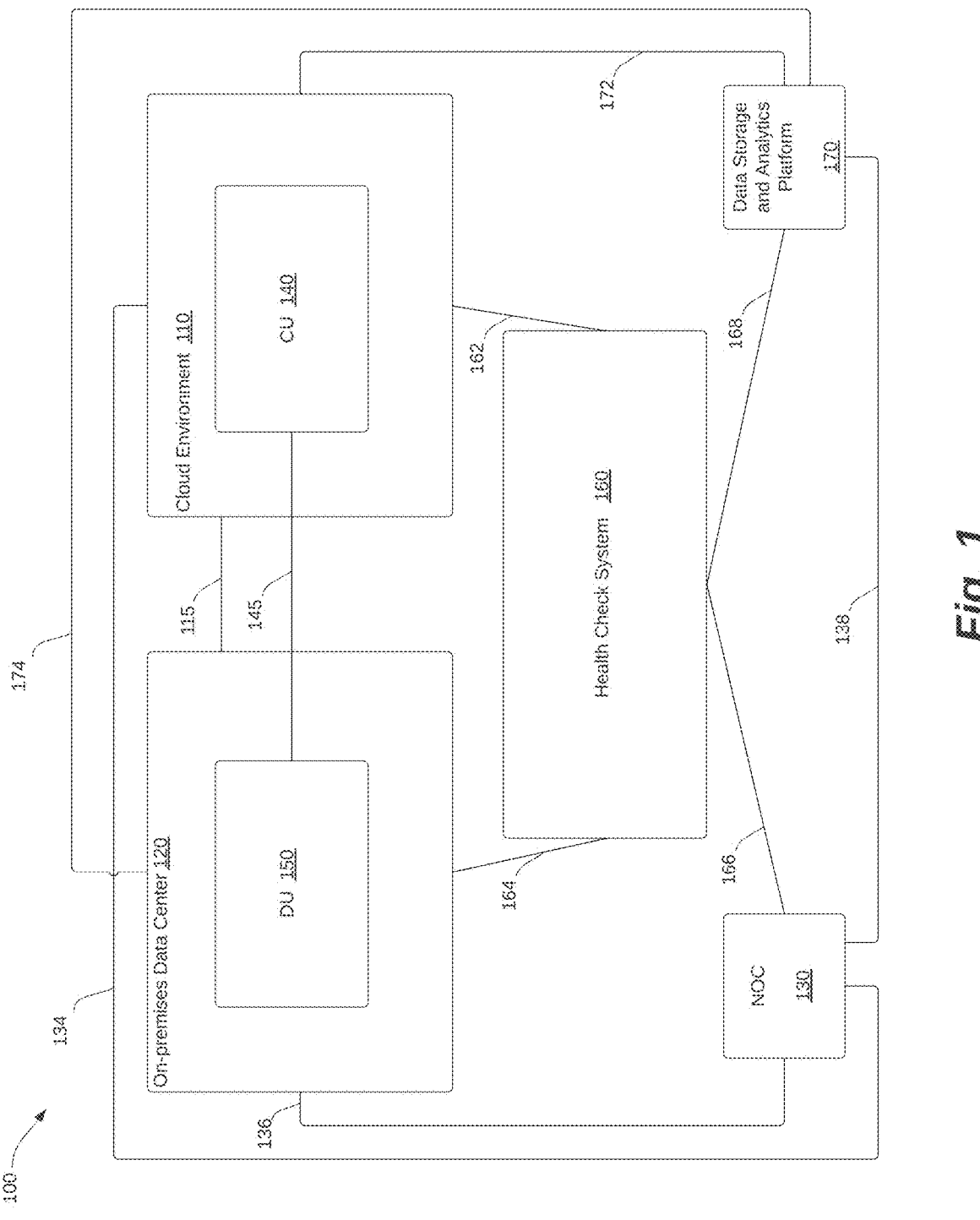
FIG. 1 is a high-level system block diagram of an example system for performing health checks on network components in a cellular wireless network, according to one non-limiting embodiment.

FIG. 1 is a high-level system block diagram of an example system 100 for performing health checks on network components in a cellular wireless network, according to one non-limiting embodiment. In an example embodiment, the system 100 comprises a Cloud Environment 110, an on-premises data center 120, a Network Operations Center (NOC) 130, a Centralized Unit (CU) 140, a Distributed Unit (DU) 150, a Health Check System 160, and a Data Storage and Analytics Platform 170.

In an example embodiment, the cloud environment 110 is connected to the on-premises data center 120 via a secure, high-bandwidth network connection 115. This connection enables seamless transfer of data and management information between the cloud-based and on-premises components of the network. Within the cloud environment 110, the CU 140 is hosted and connected via internal cloud networking 112. The CU 140 is connected to the Distributed Unit (DU) 150 through a standardized interface 145, which may be implemented using protocols such as F1 or E1.

The Distributed Unit (DU) 150 is predominantly located within the on-premises data center 120 and is connected to it through local high-speed networking 122. The DU 150 maintains its vital link to the CU 140 via the interface 145, which spans between the cloud environment 110 and the on-premises data center 120, ensuring communication between these system components.

In the present example embodiment, the Health Check System 160 is connected to the cloud environment 110 via a secure API interface 162, enabling it to monitor and interact with cloud-based resources. In some embodiments, some or all of the Health Check System 160 may be running within cloud environment 110. Additionally, Health Check System 160 links to the on-premises data center 120 through a dedicated management network 164, enabling access to local network components. The Health Check System 160 may also have a direct, high-priority connection 166 to the Network Operations Center (NOC) 130 for real-time reporting and alerts. Furthermore, the Health Check System 160 interfaces with the Data Storage and Analytics Platform 170 via a high-throughput data connection 168 for storing and analyzing the collected health data.

The Network Operations Center (NOC) 130 performs network management and monitoring. In an example embodiment, the NOC 130 utilizes connection 166 to the Health Check System 160 for receiving real-time health status updates and alerts. The NOC 130 may also have a direct link 134 to the cloud environment 110 for managing cloud-based resources and connects to the on-premises data center 120 via a secure management interface 136 for controlling local network components. To enable comprehensive network visibility, the NOC 130 has access to the Data Storage and Analytics Platform 170 through a data visualization interface 138, allowing NOC operators to view detailed analytics and historical data.

The Data Storage and Analytics Platform 170 may collect and process data from various sources. It receives health check data from the Health Check System 160 via the high-throughput connection 168 and has a direct connection 172 to the cloud environment 110 for collecting cloud-based metrics and logs. To gather data from local network components, it connects to the on-premises data center 120 through a secure data ingestion interface 174. The platform then processes this wealth of data and provides insights to the NOC 130 via the data visualization interface 138.

The interconnected Health Check System 160 enables health check data to be collected from relevant network components, processed efficiently, and made available to network operators in real-time. The architecture of system 100 enables scalable, flexible, and robust network health monitoring across both cloud-based and on-premises infrastructure, providing a comprehensive view of the entire network's health status.

Figure 2:
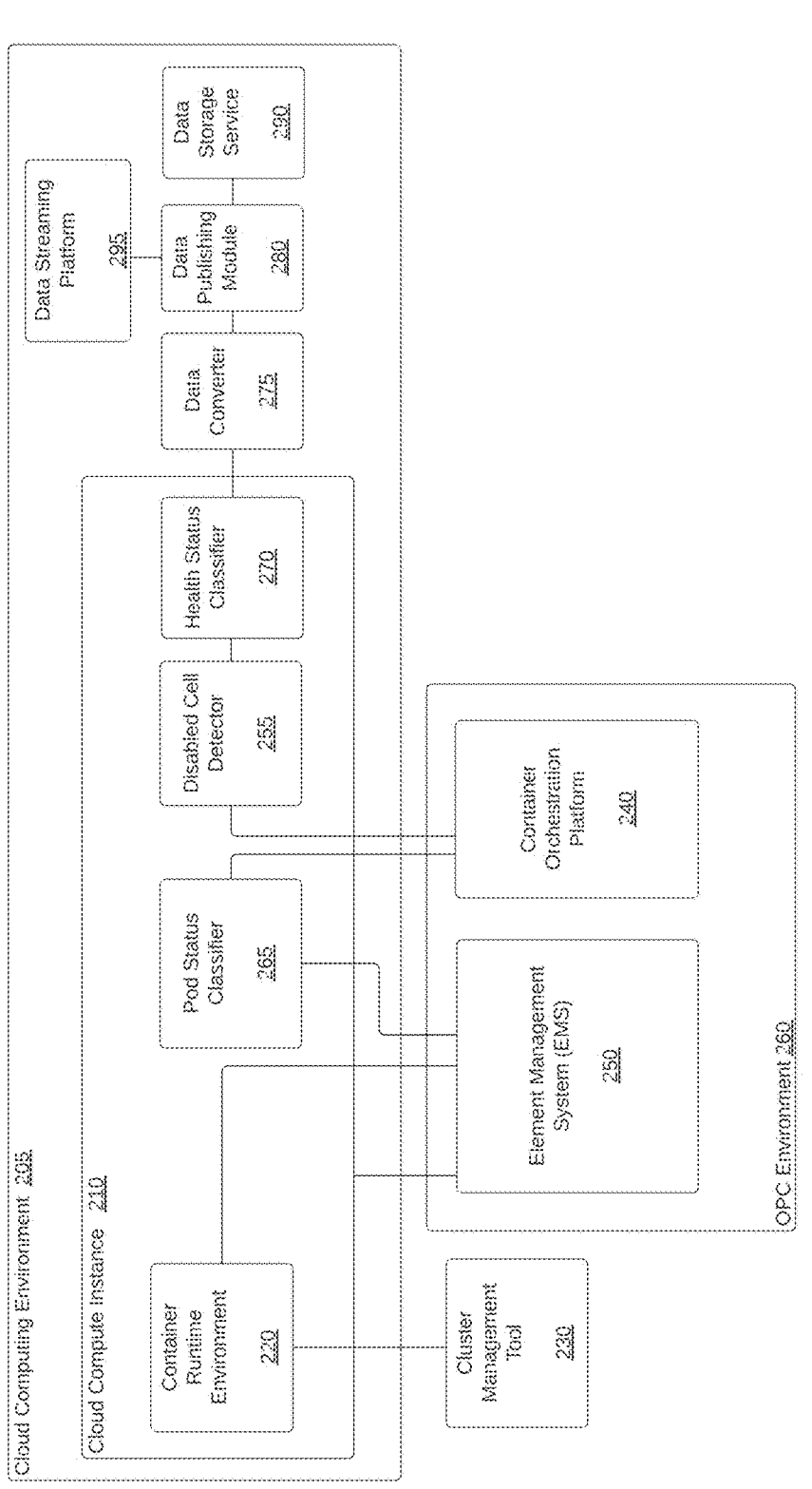
FIG. 2 is a lower-level system block diagram providing a more detailed view of the system for performing health checks on network components in a cellular wireless network and its interactions between system components, according to one non-limiting embodiment.

FIG. 2 is a lower-level system block diagram providing a more detailed view of a system 200 for performing health checks on network components in a cellular wireless network and its interactions between system components, according to one non-limiting embodiment. In an example embodiment, the Container Runtime Environment 220, The Pod Status Classifier, the Disabled Cell Detector, the Health Status Classifier, the Data Converter 275 and the Data Publishing Module 289 may comprise or be part of the Health check System 160 of FIG. 1.

In an example embodiment, the health check process begins in the Cloud Compute Instance 210, where the Container Runtime Environment 220 executes the health check scripts. These scripts interact with the Cluster Management Tool 230 to retrieve cluster data and configuration information. The scripts also access the Container Orchestration Platform 240 to extract detailed information about nodes and their status.

The process also extracts alarm data from the Element Management System (EMS) 250, which provides critical information about the status of network elements. The health check system 200 also interacts with the On-Premises Computing Environment 260 to gather data from local network components. The On-Premises Computing Environment 260, for example, may host or implement the On-premises Data Center 120 of FIG. 1.

The collected data is then processed by the Health Status Classifier 270, which classifies the health status of various components based on predefined criteria. The classified data is then sent to the Data Converter 275 and from the Data Converter 275 to Data Publishing Module 280, which publishes the results to the Streaming Data Platform 295 and stores them in the Data Storage Service 290.

In particular, the Cloud Compute Instance 210 represents a virtual server in a cloud computing environment 205 (e.g., an Amazon Web Services (AWS) cloud computing environment). For example, the cloud computing environment 205 may be or correspond to the Cloud Environment 110 of FIG. 1. In an example embodiment, this may be an Amazon EC2 (Elastic Compute Cloud) instance, although different types of cloud compute instances may be used in various different embodiments. EC2 is a web service that provides secure, resizable compute capacity in the cloud. EC2 is designed to make web-scale cloud computing easier for developers and allows users to utilize virtual computers on which to run their own computer applications.

Within the Cloud Compute Instance 210 is the Container Runtime Environment 220. The Container Runtime Environment 220 enables the deployment and execution of containerized applications. In the example embodiment, this may be implemented utilizing a Docker container, although different types of container runtime environments may be used in various different embodiments. Docker is an open-source platform that enables developers to build, deploy, run, update and manage containers. Containers are standardized, executable components that combine application source code with the operating system (OS) libraries and dependencies required to run that code in any environment.

The Cluster Management Tool 230 is in operable communication with the Container Runtime Environment 220 via Application Programming Interface (API) calls and is used to manage and orchestrate clusters of containers. In the example embodiment, an example of the Cluster Management Tool 230 is Rancher, although different cluster management tools may be utilized in different embodiments. Rancher is an open-source software platform that enables organizations to run and manage Docker and Kubernetes in production. Rancher provides a complete container management platform for deploying and running containers in production on any infrastructure. The Container Runtime Environment 220 (e.g., a Docker Container) includes scripts that obtain cluster data regarding network components via API calls from the Cluster Management Tool 230 (e.g., Rancher) and aggregates configuration files regarding the cluster data into a master configuration file (e.g., into a Yet Another Markup Language (YAML) file). A topology file (e.g., a JavaScript Object Notation (JSON) file) is created for on-premises network components based on the master configuration file.

An On-Premises Computing (OPC) Environment 260 represents the local data center infrastructure where certain network components are hosted. For example, this environment hosts sensitive or critical systems that require local management and control.

The EMS 250 within the OPC Environment 260 is in operable communication with the Container Runtime Environment 220 via an API and provides management functions for specific network elements and their components. In the example embodiment, this may be the Unified System Manager (USM) for Samsung equipment or the MTA for Mavenir equipment. These systems provide a centralized point for managing network elements, monitoring their status, and collecting performance data.

The EMS 250 interacts with various network elements, particularly the Distributed Units (DUs) and Centralized Units (CUs), to extract vital operational data. This interaction may occur through standardized protocols such as SNMP (Simple Network Management Protocol), NETCONF (Network Configuration Protocol), or vendor-specific APIs. For example, when extracting data about a Distributed Unit (DU), scripts within the EMS 250 may extract current and historical alarm data from the DU. This includes active alarms, their severity levels, and any recurring alarm patterns that might indicate underlying issues. The EMS 250 may also extract site data, such as, but not limited to, state information of the cell site and pod status. In Kubernetes, a pod is the smallest deployable unit and may contain one or more containers. The EMS 250 may provide information on pod status, including whether it's running, pending, or in an error state. The EMS 250 may also report on pod restarts, which can indicate stability issues.

The EMS 250 may provide such extracted information regarding DUs and CUs to a Pod Status Classifier 265, which classifies the status of the pod as "OK" or "NOK" (not OK) based on whether the status information received from the EMS 250 indicates the pod is running. In particular, in an example embodiment, the Pod Status Classifier 265 assigns a status of "OK" if the status information received from the EMS 250 indicates the pod is running and "NOK" if the status information received from the EMS 250 indicates the pod is not running.

The Container Orchestration Platform 240 within the OPC Environment 260 is in operable communication with the Pod Status Classifier 265 and automates the deployment, management, scaling, and networking of containers. In the example embodiment, the Container Orchestration Platform 240 is represented by Kubernetes, although different container orchestration platforms may be utilized in various different embodiments. Kubernetes is an open-source container orchestration system for automating software deployment, scaling, and management. It was originally designed by Google and is now maintained by the Cloud Native Computing Foundation.

The health check scripts executed within the Cloud Compute Instance 210 interact with the Container Orchestration Platform 240 gather detailed information about the running containers and their status. This interaction may occur through the platform's API, which provides a wealth of information about the state of the containerized applications and the underlying infrastructure.

For example, the health check scripts executed within the Container Orchestration Platform 240 may gather K8s data, which refers to information collected from a Kubernetes (K8s) cluster and may include various metrics and status information about the containerized components of the cellular network, particularly those related to the DUs and CUs deployed as containerized applications. Some examples of K8s data that might be collected include, but are not limited to: node information, including status and resource utilization of the cluster nodes; cluster information; service status, including health and accessibility of Kubernetes services; applicable region, cluster name, deployment status, including information about the current state of deployments, cell site router (CSR) reachability, VMware sync state, etc. The VMware sync state indicates whether the configuration and state of the virtual machines are in sync with their expected or desired state. This may be useful in environments where network functions are virtualized, such as in cloud-native or hybrid cloud implementations of 5G network components.

In an example embodiment, the health check system 200 queries this data from the Container Orchestration Platform 240 at regular intervals or in response to specific triggers, or pushed by the Container Orchestration Platform 240 to the health check system 200. The system 200 may use techniques such as label selectors to efficiently query data for specific components (e.g., all containers labeled as part of the DU or CU). The extracted data is then passed to the Health Status Classifier 270, which uses this information, along with data from other sources, to classify the health status of the network components. This data may be used for assessing the health and performance of the containerized network components. In an example embodiment, the health check system 200 may collect this data through the Kubernetes API, process it in the Health Status Classifier 270, which uses it alongside data from other sources (like the EMS 250) to determine the overall health status of the network components.

For example, the data provided by the EMS 250 and the Container Orchestration Platform 240 may be provided to and then joined by the Disabled Cell Detector 255 within the Cloud Compute Instance 210 to generate a joined health status dataset. The Disabled Cell Detector 255 flattens the joined health status dataset and adds actual and expected Physical Random Access Channel (PRACH) fields (e.g., significant deviations between the actual and expected PRACH performance could indicate issues with network access, coverage, or capacity). The Disabled Cell Detector

255 then detects disabled cells based on the joined health status dataset and provides this output to the Health Status Classifier 270.

In the example embodiment, the Health Status Classifier 270 within the Cloud Compute Instance 210 then processes the raw data collected from various sources and classifies the health status of various network components based on the received data. Through this classification process, the Health Status Classifier 270 provides a clear and actionable picture of the network's health, allowing for proactive management and maintenance of the cellular network.

In an example embodiment, the classification process begins by analyzing the output from the Disabled Cell Detector 255, including the joined health status dataset based on data collected from the EMS 250 and the Container Orchestration Platform 240 within 240 the OPC Environment 260. The Health Status Classifier 270 examines various parameters and metrics to classify the cell status and determine the health status of each component. These parameters may include, but are not limited to, cloud services router (CSR) reachability, error messages, service status and data, node status, VMWare sync state, specific alarm conditions, etc. If data values of one or more of these parameters indicate a negative condition or crosses a particular threshold, then the DU or other applicable network component may be classified as "Not Healthy" by the Health Status Classifier 270. Otherwise, the DU or other applicable network component may be classified as "Healthy" by the Health Status Classifier 270. In an example embodiment, the Health Status Classifier 270 may determine the health status of applicable network components by filtering and classifying alarms, classifying container statuses and evaluating criteria including cloud services router (CSR) reachability, master node status, and virtualization platform synchronization state.

Case specific issues regarding such network components may also be classified and/or identified based on the above data. The Health Status Classifier 270 may also examine the status of each cell managed by the DU. If all cells are operational and broadcasting as expected, this contributes to a "Healthy" classification. However, if one or more cells are down or underperforming, the DU's health status may be downgraded.

In some embodiments, resource utilization may be another aspect of the DU health classification. For example, the Health Status Classifier 270 may analyze the DU's CPU, memory, and network capacity usage. For instance, if CPU usage consistently exceeds 90% or if memory utilization is above 95%, the DU might be classified as "At Risk" or "Not Healthy," depending on the duration and severity of the high utilization. Error rates for various processes and interfaces are also monitored. If the error rate for data transmission exceeds a predefined threshold, such as 1% packet loss, the DU's health status might be classified as "Degraded." For DUs in the OPC Environment 260, the Health Status Classifier 270 may also consider environmental factors. If the operating temperature exceeds safe thresholds, the DU could be classified as "At Risk."

The Health Status Classifier 270 may use a similar approach for classifying the health status of the Centralized Unit (CU). The Health Status Classifier 270 may monitor the performance of control plane functions, checking for delays in signaling or session establishment, which could lead to a "Degraded" classification. For cloud-based CUs, the Health Status Classifier 270 may check the status of the underlying virtualization platform. Any issues with the virtual machines or containers hosting the CU functions may lead to a "Not Healthy" classification. The status of interfaces connecting the CU to other network elements, such as the DU (F1 interface) and the core network (NG interface), may also be verified. In an example embodiment, any interface failures may result in a "Not Healthy" status. The Health Status Classifier 270 may assess the CU's capacity utilization as well. For example, if the CU is approaching its maximum capacity for handling connected DUs or user sessions, it may be classified as "At Risk."

In some embodiments, in addition to the main network components, the Health Status Classifier 270 may also classify the health status of ancillary systems and services. When evaluating the health of the EMS 250, for example, the Health Status Classifier 270 may consider factors such as database performance, API response times, and the system's ability to collect and process alarms from network elements.

After evaluating all relevant parameters, the Health Status Classifier 270 assigns an overall health status to each component. Typical classifications might include "Healthy," "At Risk," "Degraded," or "Not Healthy." These classifications are then included in the classified data set, along with supporting metrics and timestamps. Different classifications may be used in various different embodiments.

The classified health data is then passed as a data payload to the Data Converter 275 within the Cloud Computing Environment 205. The Data Converter 275 converts the payload into a standardized format for analysis and storage. In particular, the Data Converter 275 may convert the output of the Health Status Classifier 270 into comma separated value (CSV) format for ingestion into a data warehouse, such as Redshift, for example. Redshift is a fully managed, petabyte-scale data warehouse service provided by Amazon Web Services (AWS). In the present example embodiment, Redshift may be used as a data storage and analytics platform for the processed health check data. When the data is loaded into Redshift, it becomes available for various types of analysis, including, but not limited to: real-time monitoring of current network health status; historical trend analysis to identify patterns or recurring issues; capacity planning based on long-term usage and performance data; and correlation analysis between different network components and their health metrics.

Data Publishing Module 280 within the Cloud Computing Environment 205 may receive the converted payload including health data (i.e., health check results) from the Data Converter 275. The Data Publishing Module 280 distributes this health information to the appropriate systems and personnel in a timely manner. This enables the Network Operations Center (NOC), such as NOC 130 of FIG. 1, to quickly identify and respond to any issues in the network, maintaining optimal performance and reliability of the cellular network infrastructure. For example, the Data Publishing Module 280 may publish the health information to the Streaming Data Platform 295, which enables real-time data streaming for immediate consumption by various applications. In the example embodiment, this platform may be Apache Kafka, although different streaming data platforms or messaging queues may be used in various different embodiments. Kafka is a distributed event streaming platform capable of handling trillions of events a day and is based on an abstraction of a distributed commit log.

The Data Storage Service 290 within the Cloud Computing Environment 205 may receive the converted payload including health information from the Data Publishing Module 280 and provides a scalable and durable component for storing the health check results. In the example embodiment, this may be implemented utilizing Amazon Simple Storage Service (S3). For example, the Data Storage Service 290 may comprise or be part of the Data Storage and Analytics Platform 170 of FIG. 1. The processed health information may also be made available to and displayed on a NOC Dashboard, such as that of NOC 130 of FIG. 1, allowing network administrators to monitor the health of the network components in real-time and take appropriate actions when issues are detected. The NOC Dashboard may provide a visual interface for network administrators to monitor the health and status of the network components.

FIG. 3 is a is a flow diagram of an example method 300 for performing health checks on network components in a cellular wireless network, according to one non-limiting embodiment.

At 302, the system 200 obtains cluster data regarding the network components from a cluster management tool.

At 304, the system 200 aggregates configuration files from multiple clusters into a master configuration file based on the cluster data.

At 306, the system 200 creates a topology file for on-premises network components based on the master configuration file.

At 308, the system 200 determining a health status for each network component based on a health status dataset developed using the topology file.

At 310, the system 200 generates a payload containing network component health check results based on the determined health status.

Figure 4:
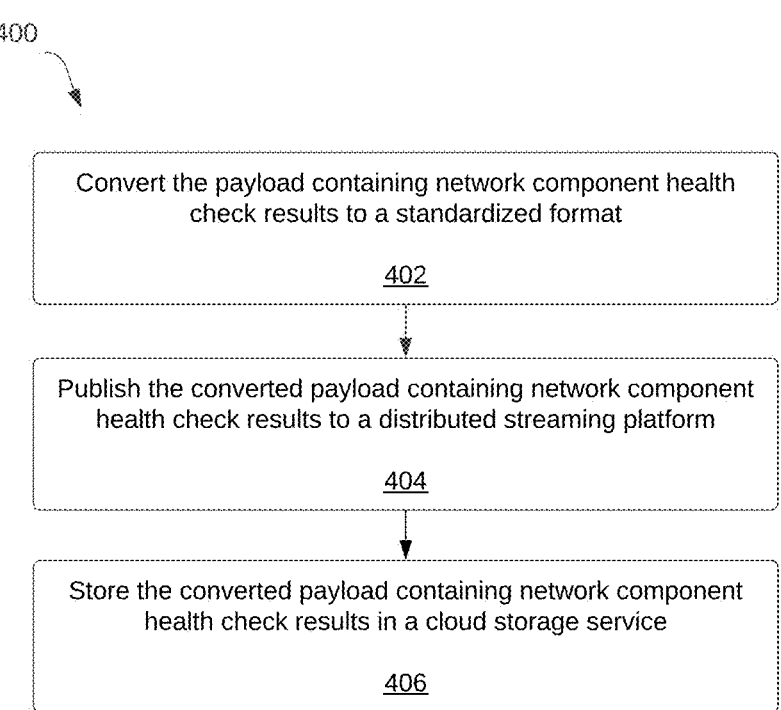
FIG. 4 is a flow diagram of an example method for processing a payload containing network component health check results useful in the method of FIG. 3, according to one non-limiting embodiment.

FIG. 4 is a flow diagram of an example method 400 for processing a payload containing network component health check results useful in the method 300 of FIG. 3, according to one non-limiting embodiment.

At 402, the system 200 converts the payload containing network component health check results to a standardized format.

At 404, the system 200 publishes the converted payload containing network component health check results to a distributed streaming platform.

At 406, the system 200 stores the converted payload containing network component health check results in a cloud storage service.

Figure 5:
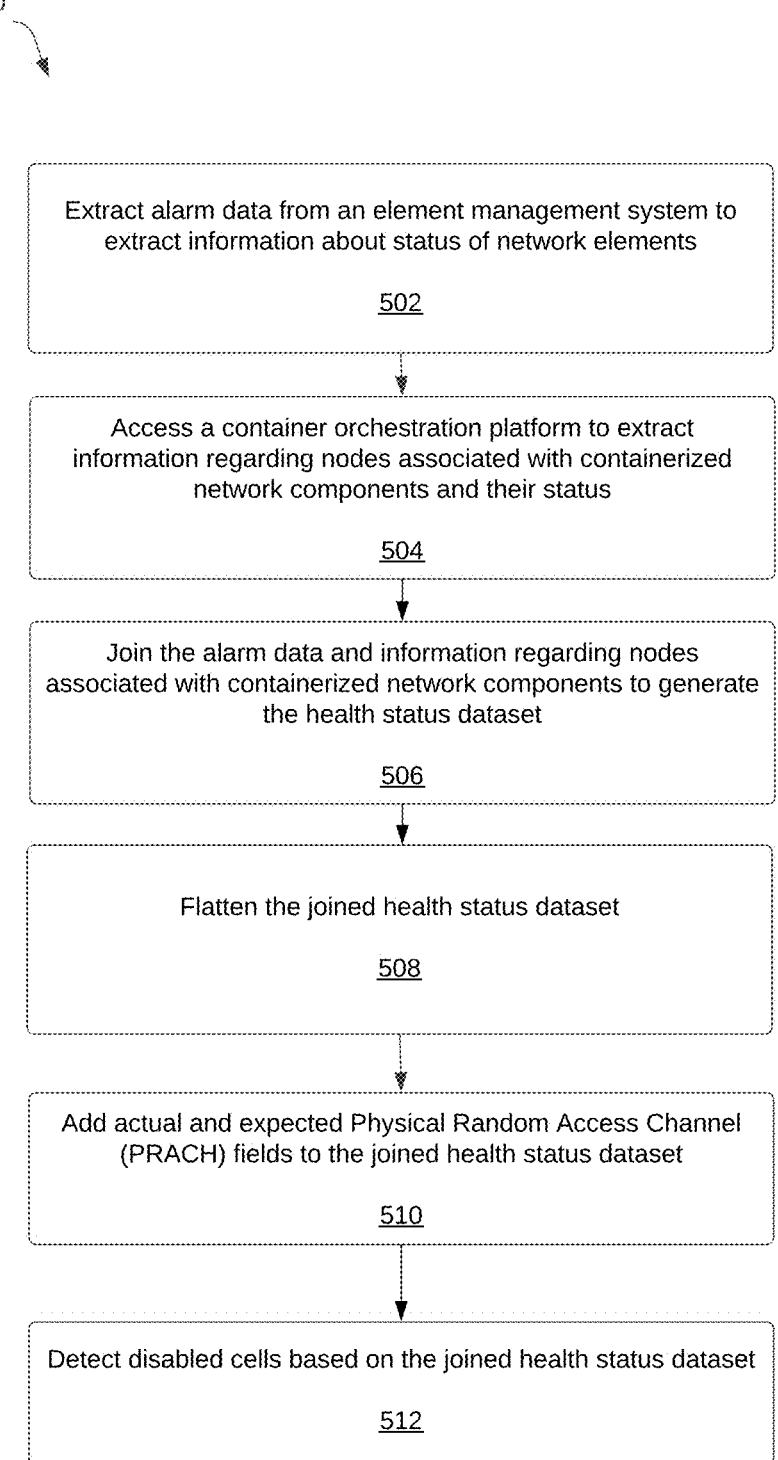
FIG. 5 is a flow diagram of an example method for determining the health status for each network component useful in the method of FIG. 3, according to one non-limiting embodiment.

FIG. 5 is a flow diagram of an example method 500 for determining the health status for each network component useful in the method 300 of FIG. 3, according to one non-limiting embodiment. In an example embodiment, the system 200, using the topology file, executes health check scripts to perform the actions below.

At 502, the system 200 extracts alarm data from an element management system to extract information about status of network elements.

At 504, the system 200 accesses a container orchestration platform to extract information regarding nodes associated with containerized network components and their status.

At 506, the system 200 joins the alarm data and information regarding nodes associated with containerized network components to generate the health status dataset including a joined health status dataset.

At 508, the system 200 flattens the joined health status dataset.

At 510, the system 200 adds actual and expected Physical Random Access Channel (PRACH) fields to the joined health status dataset.

At 512, the system 200 detects disabled cells based on the joined health status dataset.

FIG. 6 is a flow diagram of an example method 600 including further actions for determining the health status for each network component useful in the method 500 of FIG. 5, according to one non-limiting embodiment.

At 602, the system 200 examines parameters and metrics indicated by the health status dataset to classify a cell site status.

At 604, the system 200 examines parameters and metrics indicated by the health status dataset to classify the health status of various network components.

In an example embodiment, the cluster management tool, the element management system, and the container orchestration platform are accessed via APIs. This technique allows for standardized and efficient communication between the health check system and these various components.

The method further includes making the network component health check results available to and displayed on a Network Operations Center (NOC) data visualization dashboard. This enables network operators to have a clear, real-time view of the network's health status, facilitating quick decision-making and problem resolution.

The network components that undergo health checks in this method may comprise one or more of a centralized unit (CU) and a distributed unit (DU). These are key elements in modern cellular network architectures, particularly in 5G networks.

The process of determining the health status of these network components may include filtering and classifying alarms received from various network elements. Next, the system 200 classifies the statuses of containers running network functions. The system 200 also evaluates several criteria, including cloud services router (CSR) reachability, which is important for cloud-based components, the status of master nodes in the container orchestration platform, and the synchronization state of the virtualization platform.

In an example embodiment, some or all of the process is performed within a containerized environment running on a cloud computing platform. This technique leverages the scalability and flexibility of cloud infrastructure to manage the health check process efficiently.

The system 200 may also implement adaptive capabilities. For example, the system 200 may detect differences between network components implemented in a cloud environment and those implemented as on-premises devices based on the health check results. Upon detecting these differences, the method adjusts the network component health check process accordingly.

FIG. 7 shows a system diagram that describes an example embodiment of a computing system(s) 700 for implementing embodiments described herein.

The functionality described herein for cellular network component automated health checks can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various data centers, servers, network nodes, base stations and cell sites shown and/or described herein that are, or that host or implement the functions of: routers, components, microservices, PODs, containers, nodes, node groups, control planes, clusters, virtual machines, network functions (NFs), and/or other aspects described herein for cellular network component automated health checks. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more processors such as central processing units (CPUs) 714, I/O interfaces 718, other computer-readable media 720, and network connections 722.

Memory 702 may be coupled to CPUs 714 and include one or more various types of non-volatile and/or volatile storage technologies. Examples of memory 702 may include, but are not limited to, a computer-readable storage medium, flash memory, hard disk drives, optical drives, solid-state drives, various types of random access memory (RAM), various types of read-only memory (ROM), neural networks, other computer-readable storage media (also referred to as processor-readable storage media and non-transitory computer-readable storage media), or the like, or any combination thereof. Memory 702 may be utilized to store information, including computer-readable and computer-executable instructions that are utilized and executed by CPU 714 to cause operations to be performed, including those of embodiments described herein.

Memory 702 may have stored thereon control module(s) 704. The control module(s) 704 may be configured to implement and/or perform some or all of the functions of the systems, components and modules described herein for cellular network component automated health checks. Memory 702 may also store other programs and data 710, which may include rules, databases, application programming interfaces (APIs), rules and data, software containers, nodes, PODs, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include location data interfaces, sensor data interfaces, interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for performing health checks on network components in a cellular wireless network, the method comprising:
   obtaining cluster data regarding the network components from a cluster management tool;
   aggregating configuration files from multiple clusters into a master configuration file based on the cluster data;
   creating a topology file for on-premises network components based on the master configuration file;
   determining a health status for each of the network components based on a health status dataset developed using the topology file; and
   generating a payload containing network component health check results based on the determined health status.

2. The method of claim 1, further comprising: converting the payload containing the network component health check results to a standardized format;
   publishing the converted payload containing network component health check results to a distributed streaming platform; and
   storing the converted payload containing network component health check results in a cloud storage service.

3. The method of claim 1 wherein the determining the health status for said each of the network components based on the health status dataset developed using the topology file includes:
   using the topology file, executing health check scripts to:
      extract alarm data from an element management system to extract information about status of network elements;
      access a container orchestration platform to extract information regarding nodes associated with containerized network components and status of the nodes;
      join the alarm data and the information regarding the nodes associated with the containerized network components to generate the health status dataset including a joined health status dataset;
      flatten the joined health status dataset;
      add actual and expected Physical Random Access Channel (PRACH) fields to the joined health status dataset; and
      detect disabled cells based on the joined health status dataset.

4. The method of claim 3 wherein the determining the health status for said each of the network components based on the health status dataset developed using the topology file further includes:
   examining parameters and metrics indicated by the health status dataset to classify a cell site status; and
   examining parameters and metrics indicated by the health status dataset to classify the health status of various network components.

5. The method of claim 3, wherein the cluster management tool, the element management system, and the container orchestration platform are accessed via application programming interfaces (APIs).

6. The method of claim 1, further comprising making the network component health check results available to and displayed on a Network Operations Center (NOC) data visualization dashboard.

7. The method of claim 1, wherein the network components comprise one or more of a centralized unit (CU) and a distributed unit (DU).

8. The method of claim 1, wherein determining the health status includes:

filtering and classifying alarms;

classifying container statuses; and evaluating criteria including cloud services router (CSR) reachability, master node status, and virtualization platform synchronization state.

9. The method of claim 1, wherein the method is performed within a containerized environment running on a cloud computing platform.

10. The method of claim 1, further comprising:

detecting, based on the network component health check results, differences between network components implemented in a cloud environment and network components implemented as on-premises devices; and adjusting a network component health check process based on the detected differences.

11. A system for performing health checks on network components in a cellular wireless network, the system comprising:

at least one processor; and a memory storing instructions that, when executed by the at least one processor, cause the system to:

obtain cluster data regarding the network components from a cluster management tool;

aggregate configuration files from multiple clusters into a master configuration file based on the cluster data;

create a topology file for on-premises network components based on the master configuration file;

determine a health status for each of the network components based on a health status dataset developed using the topology file; and generate a payload containing network component health check results based on the determined health status.

12. The system of claim 11, wherein the instructions further cause the system to:

convert the payload containing the network component health check results to a standardized format;

publish the converted payload containing the network component health check results to a distributed streaming platform; and store the converted payload containing network component health check results in a cloud storage service.

13. The system of claim 11, wherein the determining the health status for said each of the network components based on the health status dataset developed using the topology file includes:

using the topology file to execute health check scripts to:

extracting alarm data from an element management system to extract information about status of network elements;

accessing a container orchestration platform to extract information regarding nodes associated with containerized network components and status of the nodes;

joining the alarm data and the information regarding nodes associated with the containerized network components to generate the health status dataset including a joined health status dataset;

flattening the joined health status dataset;

adding actual and expected Physical Random Access Channel (PRACH) fields to the joined health status dataset; and detecting disabled cells based on the joined health status dataset.

14. The system of claim 13, wherein the determining the health status for said each of the network components based on the health status dataset developed using the topology file further includes:

examining parameters and metrics indicated by the health status dataset to classify a cell site status; and examining parameters and metrics indicated by the health status dataset to classify the health status of various network components.

15. The system of claim 13, wherein the cluster management tool, the element management system, and the container orchestration platform are accessed via application programming interfaces (APIs).

16. A non-transitory computer-readable medium storing instructions that, when executed by at least one processor, cause the at least one processor to perform operations for performing health checks on network components in a cellular wireless network, the operations comprising:

obtaining cluster data regarding the network components from a cluster management tool;

aggregating configuration files from multiple clusters into a master configuration file based on the cluster data;

creating a topology file for on-premises network components based on the master configuration file;

determining a health status for each of the network components based on a health status dataset developed using the topology file; and generating a payload containing network component health check results based on the determined health status.

17. The non-transitory computer-readable medium of claim 16, wherein the operations further comprise:

converting the payload containing the network component health check results to a standardized format;

publishing the converted payload containing the network component health check results to a distributed streaming platform; and storing the converted payload containing the network component health check results in a cloud storage service.

18. The non-transitory computer-readable medium of claim 16, wherein determining the health status for said each of the network components based on the health status dataset developed using the topology file includes:

using the topology file, executing health check scripts to:

extract alarm data from an element management system to extract information about status of network elements;

access a container orchestration platform to extract information regarding nodes associated with containerized network components and status of the nodes;

join the alarm data and information regarding nodes associated with containerized network components to generate the health status dataset including a joined health status dataset;

flatten the joined health status dataset;

add actual and expected Physical Random Access Channel (PRACH) fields to the joined health status dataset; and detect disabled cells based on the joined health status dataset.

19. The non-transitory computer-readable medium of claim 18, wherein determining the health status for said each of the network components based on the health status dataset developed using the topology file further includes:

examining parameters and metrics indicated by the health status dataset to classify a cell site status; and examining parameters and metrics indicated by the health status dataset to classify the health status of various network components.

20. The non-transitory computer-readable medium of claim 18, wherein the cluster management tool, the element management system, and the container orchestration platform are accessed via application programming interfaces (APIs).

* * * * *